United States Patent
Shani et al.

(10) Patent No.: US 7,937,739 B2
(45) Date of Patent: May 3, 2011

(54) METHOD, DEVICE AND SYSTEM FOR CABLE TELEVISION DISTRIBUTION

(75) Inventors: Ron Shani, Misgav (IL); Yeshayahu Strull, Tel Aviv (IL); Semion Kofman, Holon (IL)

(73) Assignee: Xtend Networks, Tel-Aviv (IL)

( * ) Notice: Subject to any disclaimer, the term of this patent is extended or adjusted under 35 U.S.C. 154(b) by 1683 days.

(21) Appl. No.: 11/091,596

(22) Filed: Mar. 29, 2005

(65) Prior Publication Data

US 2006/0230425 A1  Oct. 12, 2006

(51) Int. Cl.
*H04N 7/173* (2006.01)
*H04B 10/00* (2006.01)

(52) U.S. Cl. ........ 725/118; 725/114; 725/127; 398/115; 398/163

(58) Field of Classification Search .................. 725/111, 725/116–119, 129, 147
See application file for complete search history.

(56) References Cited

U.S. PATENT DOCUMENTS

| | | | |
|---|---|---|---|
| 5,592,540 A * | 1/1997 | Beveridge ..................... | 379/184 |
| 5,864,748 A * | 1/1999 | Dail .............................. | 725/126 |
| 5,963,844 A * | 10/1999 | Dail .............................. | 725/125 |
| 6,362,908 B1 * | 3/2002 | Kimbrough et al. .......... | 398/164 |
| 6,418,558 B1 * | 7/2002 | Roberts et al. ................ | 725/129 |
| 6,490,727 B1 * | 12/2002 | Nazarathy et al. ............ | 725/129 |
| 6,577,414 B1 * | 6/2003 | Feldman et al. ................ | 398/43 |
| 2001/0030785 A1 * | 10/2001 | Pangrac et al. ................ | 359/125 |
| 2002/0107979 A1 * | 8/2002 | Sarnikowski et al. ........ | 709/238 |
| 2002/0174435 A1 * | 11/2002 | Weinstein et al. .............. | 725/80 |
| 2003/0016701 A1 * | 1/2003 | Hinson ......................... | 370/480 |
| 2004/0131357 A1 * | 7/2004 | Farmer et al. ................. | 398/67 |
| 2005/0089326 A1 * | 4/2005 | Regev et al. .................. | 398/32 |
| 2005/0125837 A1 * | 6/2005 | Farmer et al. ................ | 725/105 |
| 2005/0283816 A1 * | 12/2005 | Weinstein et al. ............ | 725/129 |

OTHER PUBLICATIONS

International Search Report, Application No. PCT/IL05/01360, mailed on Oct. 5, 2007.

* cited by examiner

*Primary Examiner* — Andrew Y Koenig
*Assistant Examiner* — Mark D Featherstone
(74) *Attorney, Agent, or Firm* — Pearl Cohen Zedek Latzer, LLP

(57) ABSTRACT

Embodiments of the invention provide a method, device and/or system for communicating over a wideband distribution network. The device may include, for example, a downstream conversion module for converting a legacy downstream electrical signal of a legacy downstream frequency band into an extended downstream optical signal of an extended downstream frequency band; and/or an upstream conversion module for converting an extended upstream optical signal of an extended upstream frequency band into a legacy upstream electrical signal of a legacy upstream frequency band. Other embodiments are described and claimed.

22 Claims, 3 Drawing Sheets

METHOD, DEVICE AND SYSTEM FOR CABLE TELEVISION DISTRIBUTION

FIELD OF THE INVENTION

The invention relates generally to Cable Television (CATV) distribution networks and, more particularly, to Hybrid Fiber Coax (HFC) infrastructure-based CATV distribution networks.

BACKGROUND

Cable television (CATV) is a form of broadcasting that transmits programs to paying subscribers via a physical land based infrastructure of coaxial ("coax") cables or via a combination of fiber-optic and coaxial cables (HFC).

CATV networks provide a direct link from a transmission center, such as a head-end, to a plurality of subscribers at various remote locations, such as homes and businesses, which are usually stationary and uniquely addressable. The head-end may be connected to the subscribers via local hubs, commonly referred to as "nodes", which route the flow of data to and/or from a predefined group of subscribers, e.g., hundreds of subscribers, in a defined geographical area, for example, a small neighborhood or an apartment complex.

Existing CATV networks utilize a signal distribution service to communicate over multiple channels using various formats, for example, analog and/or digital formats for multichannel TV programs, a high definition TV (HDTV) format, providing interactive services such as "video on demand", and other multimedia services, such as Internet access, telephony and more.

In a conventional HFC cable TV system, the head-end receives data from a wide-area data communication network, e.g., the Internet, via a Cable Modem Termination System (CMTS) interface. The head-end is connected to the local nodes via a fiber portion ("trunk"), which includes optic cables for transmitting optical signals between the head-end and the local node.

Downstream signals, which are limited to designated channels within a standard ("legacy") downstream frequency range (band) of 48 MHz to 860 MHz (or up to 1,000 MHz by recently introduced Stretching technology), are modulated by the head-end on a light beam, e.g., at a standard wavelength of about 1550 nm, and sent to the local node via the fiber trunk. An optical converter at the local node detects the optical signals and converts them into corresponding electrical signals, which may be modulated over a radio frequency (RF) carrier, to be routed to the subscribers via a coaxial ("coax") trunk. The coax trunk includes distribution cables, drop cables, amplifiers and splitters.

In the reverse direction (the upstream direction), the local optical node receives upstream data from the local subscribers via the coax trunk. These are carried by RF electrical signals at a standard upstream frequency band of 5 MHz to 42 MHz, which does not overlap with the downstream frequency band. A converter in the local optical node converts the upstream data into corresponding optical signals by modulating the data on an optical carrier beam, e.g., at a wavelength of about 1310 nm, to be transmitted back to the head-end.

The currently utilized legacy frequency band of between about 5 MHz and about 860 MHz limits the number of available downstream and upstream channels. In many applications the frequency band of 542 MHz is used for upstream transmission, and the frequency band of 50-860 MHz is used for downstream transmission.

Some Multi-system Operators (MSOs) implement the Data Over Cable Services Interface Specification (DOCSIS) protocol for Internet access, e.g., for Small and Medium Businesses (SMBs). The SMBs typically require relatively high data throughput in both the upstream and downstream directions. The currently utilized legacy frequency band may not be sufficient for providing the upstream and/or downstream throughputs required by the SMBs.

SUMMARY OF EXEMPLARY EMBODIMENTS OF THE INVENTION

Some exemplary embodiments of the invention include a method, device and/or system for transferring extended upstream and/or downstream optical signals, for example, in a Hybrid Fiber Coax (HFC) infrastructure-based CATV distribution network, between a head-end and at least one node, e.g., over a fiber section ("trunk"), as described in detail below.

According to some exemplary embodiments, the head-end may receive, e.g., from a data network, legacy downstream electrical signals, e.g., in a legacy downstream frequency bandwidth. The head-end may convert the legacy downstream electrical signals into extended downstream optical signals, e.g., in an extended downstream frequency bandwidth, which may be transmitted to the node, e.g., over the fiber trunk. The node may convert the downstream optical signals into extended downstream electrical signals, which may be distributed to one or more network subscribers, e.g., via a distribution coaxial ("coax") trunk.

Additionally or alternatively, the node may be able to receive, e.g., from the distribution coax trunk, extended upstream electrical signals, e.g., in an extended upstream frequency bandwidth. The node may be able to convert the extended upstream electrical signals into corresponding extended upstream optical signals, which may be transmitted to the head-end, e.g., over the fiber trunk. The head-end may be able to convert the extended upstream optical signals into legacy upstream electrical signal, e.g., in a legacy upstream frequency bandwidth. The legacy upstream electrical signals may then be transferred, for example, to the data network, e.g., using a Cable Modem Termination System (CMTS) interface.

BRIEF DESCRIPTION OF THE DRAWINGS

The invention will be understood and appreciated more fully from the following detailed description of embodiments of the invention, taken in conjunction with the accompanying drawings of which.

Figure 1:
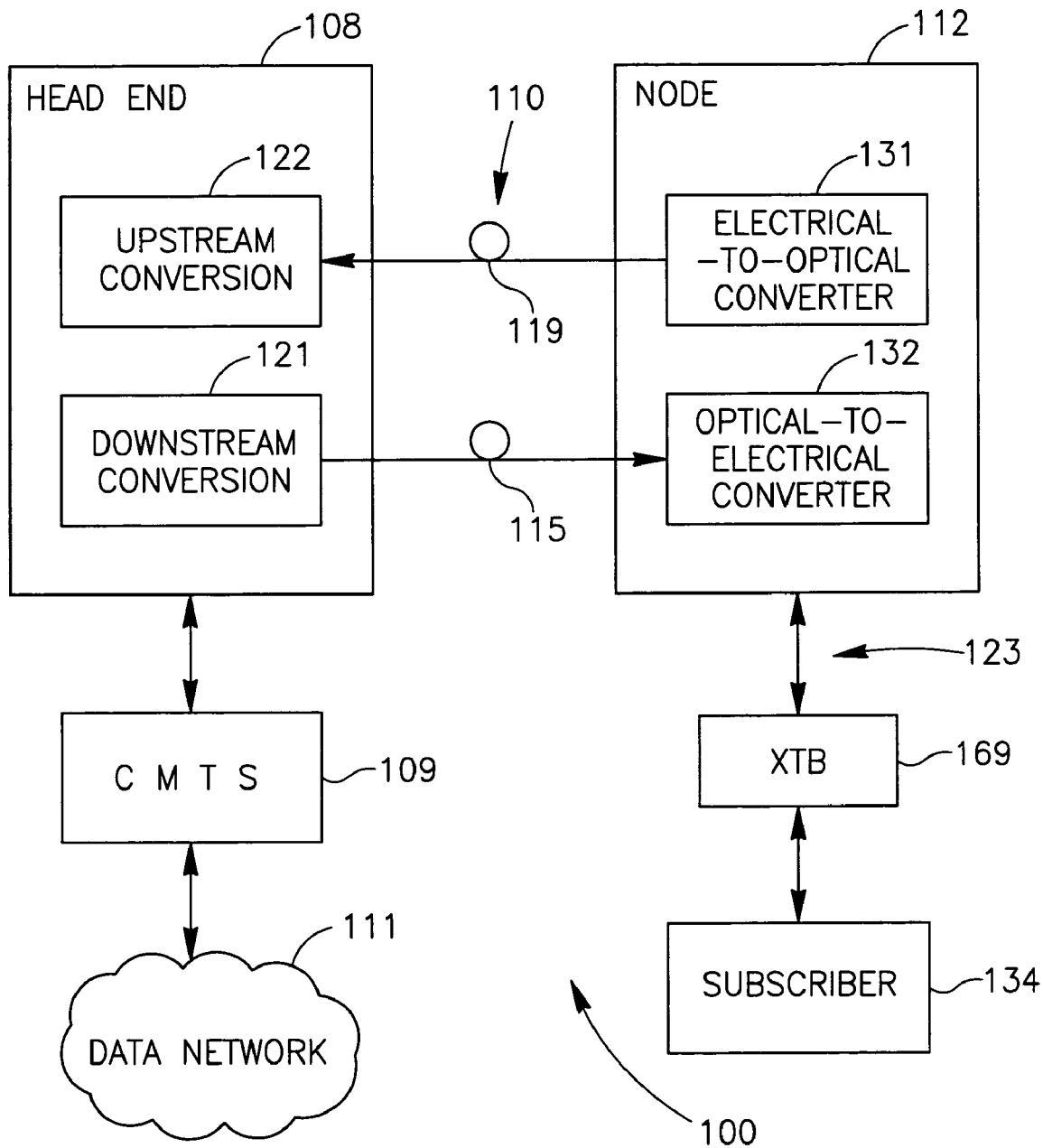
FIG. 1 is a simplified illustration of a Cable Television (CATV) system in accordance with some exemplary embodiments of the invention.

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF EXEMPLARY EMBODIMENTS OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, some features of the invention relying on principles and implementations known in the art may be omitted or simplified to avoid obscuring the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of wideband distribution networks supporting a wide frequency band, in accordance with exemplary embodiments of the invention, are described in U.S. patent application Ser. No. 09/830,015, filed Jul. 20, 2001, entitled "SYSTEM AND METHOD FOR EXPANDING THE OPERATIVE BANDWIDTH OF A CABLE TELEVISION COMMUNICATION SYSTEM", and published Nov. 21, 2002 as US Publication Number US20020174435 (Reference 1), in International Patent Application PCT/IL0000655, filed Oct. 16, 2000, entitled "SYSTEM AND METHOD FOR EXPANDING THE OPERATIVE BANDWIDTH OF A CABLE TELEVISION COMMUNICATION SYSTEM", and published Apr. 25, 2002 as International Publication number WO02/33968 (Reference 2), in U.S. patent application Ser. No. 10/869,578, filed Jun. 16, 2004, entitled "A WIDEBAND NODE IN A CATV NETWORK" (Reference 3), and in U.S. patent application Ser. No. 11/041,905, filed Jan. 25, 2005, entitled "DEVICE, SYSTEM AND METHOD FOR CONNECTING A SUBSCRIBER DEVICE TO A WIDEBAND DISTRIBUTION NETWORK" (Reference 4), the disclosure of all of which is incorporated herein by reference.

In some exemplary embodiments of the invention described herein, the term "wide frequency band" may refer to an exemplary frequency band of, e.g., 5-3000 MHz; the term "extended upstream frequency band" may refer to an exemplary frequency band of 2250-2750 MHz; the term "extended downstream frequency band" may refer to an exemplary frequency band of 1250-1950 MHz; the term "legacy frequency band" may refer to an exemplary frequency band of 5-860 MHz; the term "legacy upstream frequency band" may refer to an exemplary frequency band of 5-42 MHz or 5-65 MHz; and the term "legacy downstream frequency band" may refer to an exemplary frequency band of 54-860 MHz. However, it will be appreciated by those skilled in the art that in other embodiments of the invention, these exemplary frequency bands may be replaced with any other suitable wide frequency band, extended upstream frequency band, extended downstream frequency band, legacy frequency band, legacy downstream frequency band, legacy upstream frequency band, and/or any other desired frequency band. For example, the systems, devices and/or methods of some embodiments of the invention may be adapted for a wide frequency band of between 5 MHz and more than 3000 MHz, e.g., 4000 MHz, and/or a legacy band of 5-1000 MHz.

In some exemplary embodiments of the invention described herein, the term "upstream electrical signals" may refer to upstream signals, which may be modulated, for example, over a Radio-Frequency (RF) carrier of an upstream frequency band, e.g., a legacy upstream frequency band or an extended upstream frequency band. The term "downstream electrical signals" as used herein refers to downstream signals, which may be modulated, for example, over a RF carrier of a downstream frequency band, e.g., a legacy downstream frequency band or an extended downstream frequency band.

In some exemplary embodiments of the invention described herein, the term "extended upstream optical signals" may refer to signals of an extended upstream frequency band modulated over an optical carrier beam, which may have, for example, a wavelength of 1550 nm or any other suitable wavelength. The term "extended downstream optical signals" may refer to signals of an extended downstream frequency band modulated over an optical carrier beam, which may have, for example, a wavelength of 1310 nm or any other suitable wavelength. The term "legacy upstream optical signals" may refer to signals of a legacy upstream frequency band modulated over an optical carrier beam, which may have, for example, a wavelength of 1550 nm or any other suitable wavelength. The term "legacy downstream optical signals" may refer to signals of a legacy downstream frequency band modulated over an optical carrier beam, which may have, for example, a wavelength of 1310 nm or any other suitable wavelength.

Some exemplary embodiments of the invention include a method, device and/or system for transferring extended upstream and/or downstream optical signals between a head-end and at least one node, e.g., over a fiber section ("trunk"), as described in detail below.

According to some exemplary embodiments, the head-end may receive, e.g., from a data network, legacy downstream electrical signals, e.g., in a legacy downstream frequency bandwidth. The head-end may up-convert the legacy downstream electrical signals into up-converted downstream electrical signals, e.g., in an extended frequency bandwidth. The head-end may also convert the up-converted downstream electrical signals into corresponding downstream optical signals, which may be transmitted to the node, e.g., over the fiber trunk. The node may convert the downstream optical signals into extended downstream electrical signals, which may be distributed to one or more network subscribers, e.g., via a distribution coaxial ("coax") trunk.

Additionally or alternatively, the node may be able to receive, e.g., from the distribution coax trunk, extended upstream electrical signals, e.g., in an extended upstream frequency bandwidth. The node may be able to convert the extended upstream electrical signals into corresponding upstream optical signals, which may be transmitted to the head-end, e.g., over the fiber trunk. The head-end may be able to convert the upstream optical signals into extended upstream electrical signals, and to down-convert the extended upstream electrical signals into legacy upstream electrical signal, e.g., in a legacy upstream frequency bandwidth. The legacy upstream electrical signals may then be transferred, for example, to the data network, e.g., using a Cable Modem Termination System (CMTS) interface or any other suitable router.

According to exemplary embodiments of the invention, conversion of the legacy downstream electrical signals into the extended downstream electrical signals, and/or conversion of the extended upstream electrical signals into the legacy upstream electrical signals may be performed by the head-end. This may enable using a head-end configuration including a common upstream conversion module for converting extended upstream signals received from a plurality of nodes; and/or a common downstream conversion module for converting extended downstream signals to be transmitted a plurality of nodes. Such a head-end configuration may be relatively inexpensive to install and/or maintain, e.g., compared to a configuration wherein the conversion of the legacy signals into the extended signals is performed by each one of the nodes. Furthermore, such head-end configuration may be connected, for example, to an existing, e.g., standard, legacy CMTS interface or router able to generate legacy downstream signals and/or process legacy upstream signals, without the need to modify and/or replace the existing CMTS interface with a CMTS interface specifically designed to enable communicating over the extended frequency band.

Reference is made to FIG. 1, which illustrates a wideband CATV distribution system 100, according to some exemplary embodiments of the invention.

According to some exemplary embodiments of the invention, CATV system 100 may include a Hybrid Fiber Coax (HFC) plant infrastructure. For example, system 100 may include a head-end 108 able to communicate with at least one node 112 via a fiber trunk 110, as described in detail below. According to some exemplary embodiments of the invention, at least one node 112 may include a plurality of nodes connected to fiber trunk 110, e.g., using a plurality of splitters and/or any other suitable connectors and/or other components or devices.

According to some exemplary embodiments of the invention, system 100 may support a wide frequency band, e.g., including at least a subset of a frequency band of 5-3000 MHz as described in References 1, 2, and/or 3. The wide frequency band may include, for example, at least a legacy downstream frequency band, for example, including at least a subset of a frequency band of 5-1000 MHz, e.g., a frequency band of 54-860 MHz; a legacy upstream frequency band, for example, including at least a subset of a frequency band of 5-1000 MHz, e.g., a frequency band of 5-42 MHz; an extended downstream frequency band, for example, including at least a subset of a frequency band of 1000-3000 MHz, e.g., a frequency band of 1250-1950 MHz; and/or an extended upstream frequency band, for example, including at least a subset of a frequency band of 1000-3000, e.g., a frequency band of 2250-2750 MHz.

According to exemplary embodiments of the invention, system 100 may also include a CMTS interface 109 to connect between head-end 108 and a wide-area data communication network 111, e.g., the Internet. For example, CMTS interface 109 may receive data from network 111 and/or transfer data to network 111, e.g., using any suitable network browser as is known in the art. CMTS interface 109 may generate legacy downstream electrical signals by modulating RF signals of the downstream legacy frequency band based on the data received from network 111. CMTS 109 may also provide network 111 with data of legacy upstream RF signals, which may be received from head-end 108, by demodulating the legacy upstream RF signals. CMTS interface 109 may include any suitable CMTS interface configuration, e.g., a CMTS interface configuration compatible with the Data Over Cable Services Interface Specification (DOCSIS) protocol.

Aspects of the invention are described herein in the context of an exemplary embodiment of a head-end, e.g., head-end 108, and a CMTS interface, e.g., CMTS interface 109, which may be implemented as separate modules of a CATV distribution system, e.g., system 100. However, it will be appreciated by those skilled in the art that, according to other embodiments of the invention, the head-end and the CMTS interface may be implemented in any desired combination. For example, CMTS interface 109 may be implemented as part of head-end 108.

According to some exemplary embodiments of the invention, head-end 108 may include a downstream conversion module 121 to convert legacy downstream electrical signals, e.g., received from CMTS interface 109, into extended downstream optical signals to be transmitted over fiber trunk 110. For example, conversion module 121 may up-convert the legacy downstream electrical signals into up-converted downstream electrical signals of an extended upstream frequency band, and may then convert the up-converted signals into corresponding downstream optical signals, e.g., as described below with reference to FIG. 2.

According to exemplary embodiments of the invention, node 112 may include an optical-to-electrical converter 132 to receive the downstream optical signals from fiber trunk 110, and to convert the downstream optical signals into extended downstream electrical signals. The extended downstream electrical signals may be distributed to one or more network subscribers 134, e.g., via a coax trunk 123.

Coax trunk 123 may include any suitable configuration of one or more coax distribution cables, Line Extender Amplifiers (LEX), splitters, tap devices, drop cables, and/or any other desired modules, e.g., as described in References 1, 2 and/or 3. One or more of network subscribers 134 may include, for example, a computing platform and/or a television, which may be connected to coax trunk 123, e.g., by a cable modem and/or a Set Top Box (STB), e.g., as described in References 1, 2 and/or 3.

According to some exemplary embodiments of the invention, system 100 may also include at least one wideband subscriber interface device 169 (also referred to herein as "the XTB") to enable connecting one or more of subscribers 134 to the wideband network. For example, XTB 169 may be able to convert extended downstream signals received from node 112 into downstream signals in a frequency band supported by subscriber 134; and/or convert upstream signals in a frequency band supported by subscriber 134 into extended upstream signals to be transmitted to node 112, e.g., as described in Reference 4. Thus, subscriber interface device 169 may allow, for example, the use of the extended frequency bands within system 100, while retaining the use of, e.g., existing, legacy equipment at the subscriber's location, as described in Reference 4.

Additionally or alternatively, according to some exemplary embodiments, node 112 may receive extended upstream electrical signals, for example, from subscriber 134 and/or XTB 169, e.g., via coax trunk 123. Node 112 may include an electrical-to-optical converter 131 to convert the extended upstream electrical signals into corresponding extended upstream optical signals to be transferred to head-end 108, e.g., via fiber trunk 110. Head-end 108 may include an upstream conversion module 122 to convert the extended upstream optical signals into legacy upstream electrical signals, e.g., to be transferred to CMTS interface 109. For example, upstream conversion module 122 may convert the extended upstream optical signals into corresponding extended upstream electrical signals, and convert the extended upstream electrical signals into the legacy upstream electrical signals, e.g., as described below with reference to FIG. 3.

Fiber trunk 110 may include any suitable configuration for transferring downstream optical signals from head-end 108 to node 112, and/or for transferring upstream optical signals from node 112 to head-end 108. For example, fiber trunk 110 may include a first fiber section 115 for transferring the downstream optical signals from head-end 108 to node 112, and a second fiber section 119 for transferring the upstream optical signals from node 112 to head-end 108. Fiber trunk 110 may include any other desired configuration, e.g., as described below with reference to FIG. 4 and/or FIG. 5.

Aspects of the invention are described herein in the context of an exemplary embodiment of an upstream conversion module, e.g., upstream conversion module 122, and a downstream conversion module, e.g., downstream conversion module 121, which may be implemented as separate modules of a head-end, e.g., head-end 108. However, it will be appreciated by those skilled in the art that, according to other embodiments of the invention, the upstream conversion module and the downstream conversion module may both be implemented as a single conversion module.

Figure 2:
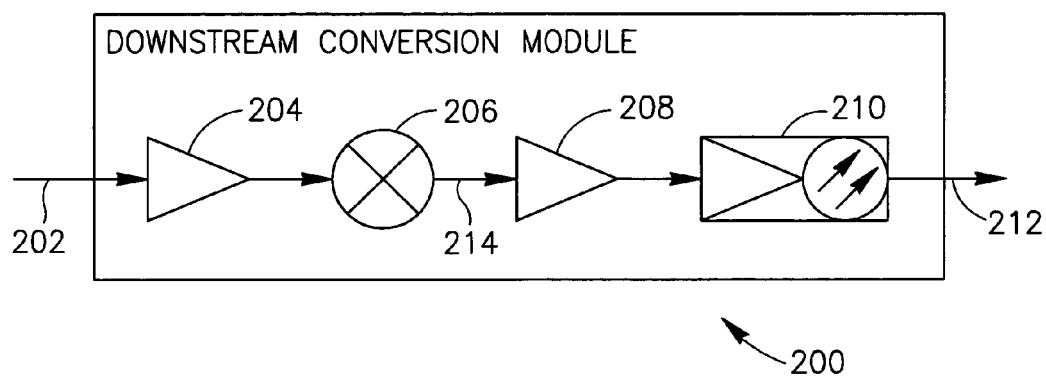
FIG. 2 is a simplified illustration of a downstream conversion module in accordance with some exemplary embodiments of the invention.

Reference is made to FIG. 2, which illustrates a downstream conversion module 200 in accordance with some exemplary embodiments of the invention.

Although the invention is not limited in this respect, module 200 may perform the functionality of downstream conversion module 121 (FIG. 1).

According to some exemplary embodiments of the invention, module 200 may include an up-converter 206 to up-convert a legacy downstream electrical signal 202 of a legacy frequency band into an extended downstream electrical signal 214 of an extended frequency band. Module 200 may also include an electrical-to-optical converter 210 to convert extended downstream electrical signal 214 into an extended downstream optical signal 212. For example, converter 210 may modulate data of signal 214 on an optical carrier beam, e.g., at a wavelength of 1550 nm or any other suitable wavelength.

According to some exemplary embodiments of the invention, module 200 may also include an amplifier 204 to amplify legacy downstream electrical signal 202, e.g., before signal 202 is up-converted by up-converter 206; and/or an amplifier 208 to amplify extended downstream electrical signal 214, e.g., before signal 214 is converted by converter 210. Module 200 may also include any other desired devices, unit and/or modules.

Figure 3:
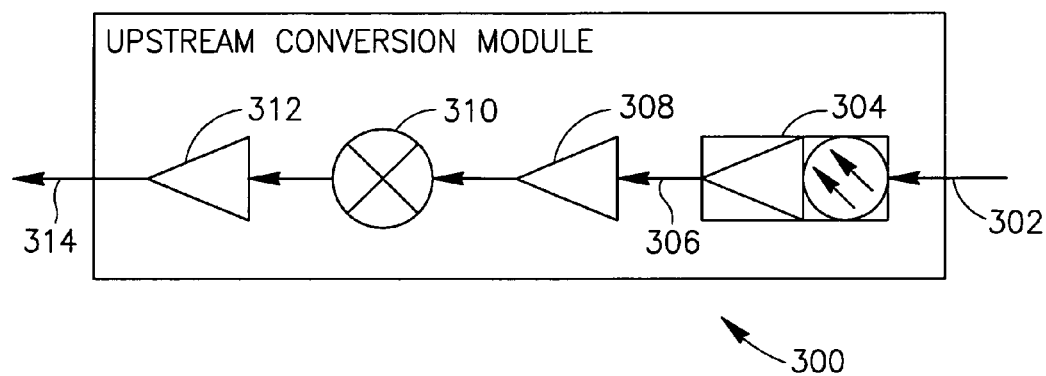
FIG. 3 is a simplified illustration of an upstream conversion module in accordance with some exemplary embodiments of the invention.

Reference is made to FIG. 3, which illustrates an upstream conversion module 300 in accordance with some exemplary embodiments of the invention.

Although the invention is not limited in this respect, module 300 may perform the functionality of upstream conversion module 122 (FIG. 1).

According to some exemplary embodiments of the invention, module 300 may include an optical-to-electrical converter 304 to convert an extended upstream optical signal 302 into a corresponding extended upstream electrical signal 306 of an extended upstream frequency band. For example, converter 304 may convert and/or modulate data of optical signal 302 onto an RF carrier of the extended upstream frequency band. Module 300 may also include a down-converter 310 to down-convert extended upstream electrical signal 306 into a legacy upstream electrical signal 314 of a legacy upstream frequency band.

According to some exemplary embodiments of the invention, module 300 may also include an amplifier 308 to amplify extended upstream electrical signal 306, e.g., before signal 306 is down-converted by down-converter 310; and/or an amplifier 312 to amplify legacy upstream electrical signal 314. Module 300 may also include any other desired devices, unit and/or modules.

Figure 4:
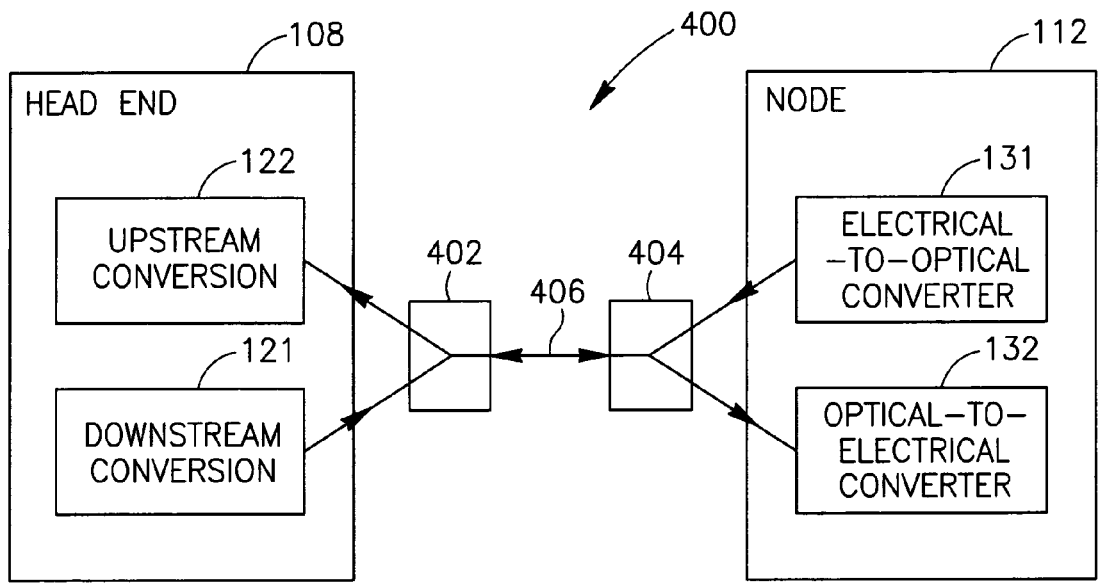
FIG. 4 is a simplified illustration of a fiber trunk configuration in accordance with one exemplary embodiment of the invention.

Reference is now made to FIG. 4, which illustrates a fiber trunk configuration 400 in accordance with one exemplary embodiment of the invention.

Although the invention is not limited in this respect, configuration 400 may be implemented by system 100 (FIG. 1), e.g., in addition to or instead of fiber trunk configuration 110 (FIG. 1).

According to the exemplary embodiments of FIG. 4, configuration 400 may include a fiber section 406, which may be capable of transferring both downstream and upstream signals, e.g., optical downstream signals from head-end 108 to node 112 and optical upstream signals from node 112 to head-end 108. Fiber section 406 may include any suitable arrangement of one or more optic fibers, e.g., as known in the art. For example, fiber section 406 may include one or more optic fibers able to transfer both an optical beam having a wavelength of 1310 nm and an optical beam having a wavelength of 1550 nm, and/or an optical beam of any other desirable wavelength.

Configuration 400 may also include a first optical diplexer 402 to route an extended downstream optical signal from downstream conversion module 121 to fiber section 406, and to route an extended upstream optical signal from fiber section 406 to upstream conversion module 122. Configuration 400 may also include a second optical diplexer 404 to route the extended upstream optical signal from electrical-to-optical converter 131 to fiber section 406, and to route the extended downstream optical signal from fiber section 406 to optical-to-electrical converter 132. Diplexer 402 and/or diplexer 404 may include, for example, any suitable configuration of one or more optic filters.

Aspects of the invention are described herein in the context of an exemplary embodiment of a head-end, e.g., head-end 108, one or more optical diplexers, e.g., diplexer 402 and/or diplexer 404, and a node, e.g., node 112, which may be implemented as separate modules of a CATV distribution system, e.g., system 100 (FIG. 1). However, it will be appreciated by those skilled in the art that, according to other embodiments of the invention, the head-end, the one or more optical diplexers, and the node may be implemented in any desired combination. For example, diplexer 402 may be implemented as part of head-end 108, and/or diplexer 404 may be implemented as part of node 112.

Figure 5:
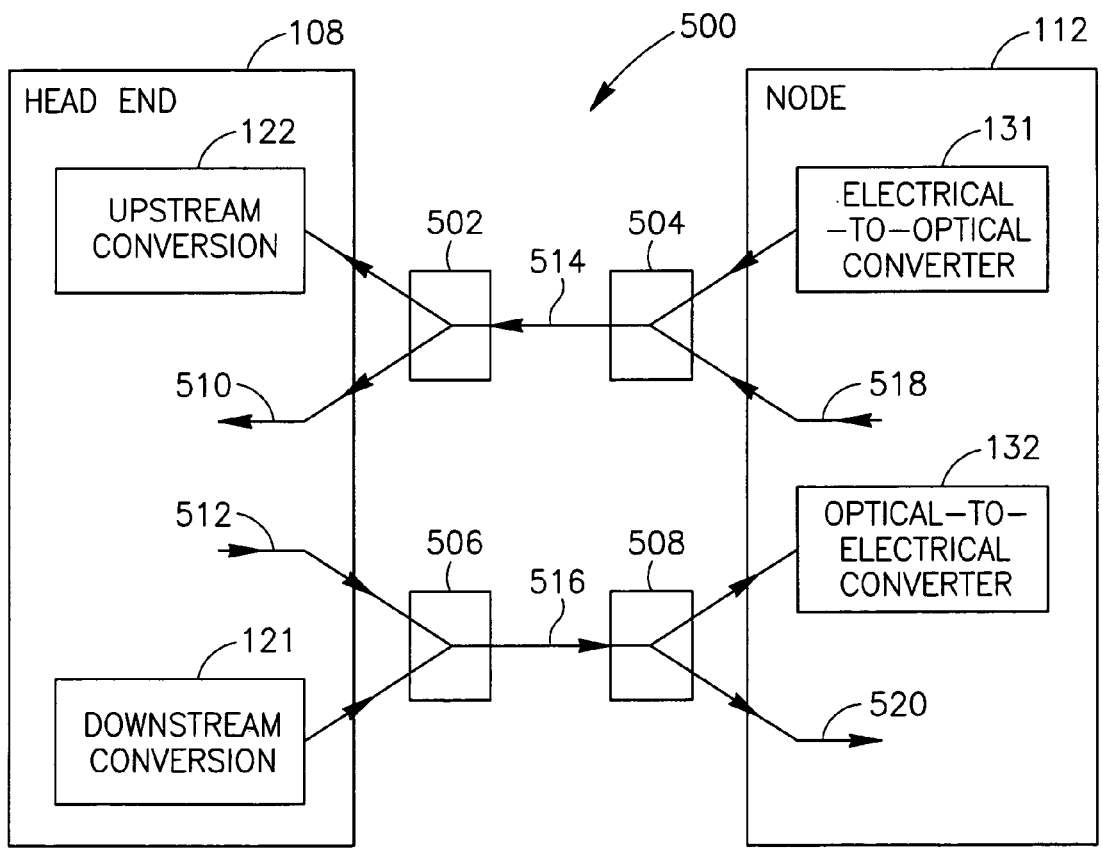
FIG. 5 is a simplified illustration of a fiber trunk configuration in accordance with another exemplary embodiment of the invention.

Reference is now made to FIG. 5, which illustrates a fiber trunk configuration 400 in accordance with another exemplary embodiment of the invention.

Although the invention is not limited in this respect, configuration 500 may be implemented by system 100 (FIG. 1), e.g., in addition to or instead of fiber trunk configuration 110 (FIG. 1).

According to the exemplary embodiments of FIG. 5, configuration 500 may include a first fiber section 514, which may be capable of transferring upstream optical signals from node 112 to head-end 108; and a second fiber section, which may be capable of transferring downstream optical signals from head-end 108 to node 112. Fiber sections 514 and/or 516 may include any suitable arrangement of one or more optic fibers, e.g., as known in the art. For example, fiber section 514 may include one or more optic fibers able to transfer an optical beam having a wavelength of 1310 nm and/or any other desirable wavelength. Fiber section 516 may include one or more optic fibers able to transfer an optical beam having a wavelength of 1550 nm and/or any other desirable wavelength.

According to some exemplary embodiments of the invention, head-end 108 may be able to generate legacy downstream optical signals corresponding to a legacy downstream frequency band, and/or node 112 may be able to generate legacy upstream optical signals corresponding to a legacy upstream frequency band, e.g., using any legacy electrical-to-optical converter as is known in the art. It may be desired to transfer the legacy upstream optical signals to head-end 108 and/or to transfer the legacy downstream optical signals from head-end 108 to node 112.

According to some exemplary embodiments of the invention, fiber trunk configuration 500 may be used for transferring both upstream legacy optical signals and extended upstream optical signals over a common fiber section, e.g., fiber section 514; and/or transferring both downstream legacy optical signals and extended downstream optical signals over a common fiber section, e.g., fiber section 516, as described below.

Configuration 500 may also include a first optical diplexer 506 to route an extended downstream optical signal from downstream conversion module 121 to fiber section 516, and to route a legacy downstream optical signal from a terminal 512 of head-end 108 to fiber section 516. Terminal 512 may be connected, for example, to a legacy electrical-to-optical converter (not shown). Configuration 500 may also include a second optical diplexer 508 to route the extended downstream optical signal from fiber section 516 to optical-to-electrical converter 132, and to route the legacy downstream optical signal from fiber section 516 to a terminal 520 of node 112. Terminal 520 may be connected, for example, to a legacy optical-to-electrical converter (not shown). Configuration 500 may further include a third optical diplexer 504 to route an extended upstream optical signal from electrical-to-optical converter 131 to fiber section 514, and to route a legacy upstream optical signal from a terminal 518 of node 112 to fiber section 514. Terminal 518 may be connected, for example, to a legacy electrical-to-optical converter (not shown). Configuration 500 may also include a fourth optical diplexer 502 to route the extended upstream optical signal from fiber section 514 to upstream conversion module 122, and to route the legacy upstream optical signal from fiber section 514 to a terminal 510 of head-end 108. Terminal 510 may be connected, for example, to a legacy optical-to-electrical converter (not shown). Diplexers 502, 504, 506 and/or 508 may include, for example, any suitable configuration of one or more optic filters.

Aspects of the invention are described herein in the context of an exemplary embodiment of a head-end, e.g., head-end 108, one or more optical diplexers, e.g., diplexers 502, 504, 506, and/or 508, and a node, e.g., node 112, which may be implemented as separate modules of a CATV distribution system, e.g., system 100 (FIG. 1). However, it will be appreciated by those skilled in the art that, according to other embodiments of the invention, the head-end, the one or more optical diplexers, and the node may be implemented in any desired combination. For example, one or more diplexers 502 and 506 may be implemented as part of head-end 108; and/or one or more of diplexers 504 and 508 may be implemented as part of node 112.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. A head-end apparatus for communicating with one or more nodes of a wideband distribution network supporting a wide frequency band including at least a legacy downstream frequency band and an extended downstream frequency band, the head-end apparatus comprising:
 a downstream conversion module for converting a legacy downstream electrical signal of said legacy downstream frequency band into an extended downstream optical signal of said extended downstream frequency band, wherein said extended downstream frequency band comprises at least a sub-set of a frequency band of 1000-3000 MHz; and
 an optical diplexer to route said extended downstream optical signal and a legacy downstream optical signal from said head-end apparatus to a fiber section for transferring on said fiber section both said extended downstream optical signal and said legacy downstream optical signal from said head-end apparatus to a node.

2. The head-end apparatus of claim 1, wherein said downstream conversion module comprises:
 an up-converter to up-convert said legacy downstream electrical signal into an up-converted downstream electrical signal of said extended downstream frequency band; and
 an electrical-to-optical converter for converting said up-converted electrical signal into said extended downstream optical signal.

3. The head-end apparatus of claim 1, wherein said wide frequency band includes a legacy upstream frequency band and an extended upstream frequency band, and wherein said head-end apparatus comprises:
 an upstream conversion module for converting an extended upstream optical signal of said extended upstream frequency band into a legacy upstream electrical signal of said legacy upstream frequency band, wherein said extended upstream frequency band comprises at least a sub-set of a frequency band of 1000-3000 MHz.

4. The head-end apparatus of claim 1, wherein said legacy downstream frequency band comprises at least a sub-set of a legacy frequency band of 5-1000 MHz.

5. The head-end apparatus of claim 3, wherein said upstream conversion module comprises:

an optical-to-electrical converter for converting said extended upstream optical signal into an extended upstream electrical signal of said extended upstream frequency band; and a down-converter to down-convert the extended upstream electrical signal into said legacy upstream electrical signal.

6. The head-end apparatus of claim 3, wherein said legacy upstream frequency band comprises at least a sub-set of a legacy frequency band of 5-1000 MHz.

7. A head-end apparatus for communicating with one or more subscribers of a wideband distribution network supporting a wide frequency band including at least a legacy upstream frequency band and an extended upstream frequency band, the head-end apparatus comprising:

an optical diplexer to route an extended upstream optical signal of said extended upstream frequency band and a legacy upstream optical signal to said head-end apparatus from a fiber section for transferring both said extended upstream optical signal and said legacy upstream optical signal from a node to said head-end apparatus; and an upstream conversion module for receiving said extended upstream optical signal and converting said extended upstream optical signal of said extended upstream frequency band into a legacy upstream electrical signal of said legacy upstream frequency band, wherein said extended upstream frequency band comprises at least a sub-set of a frequency band of 1000-3000 MHz.

8. The head-end apparatus of claim 7, wherein said upstream conversion module comprises:

an optical-to-electrical converter for converting said extended upstream optical signal into an extended upstream electrical signal of said extended upstream frequency band; and a down-converter to down-convert said extended upstream electrical signal into said legacy upstream electrical signal.

9. The head-end apparatus of claim 7, wherein said legacy upstream frequency band comprises at least a sub-set of a legacy frequency band of 5-1000 MHz.

10. A wideband distribution network supporting a wide frequency band including at least a legacy downstream frequency band and an extended downstream frequency band, the system comprising:

a head-end apparatus including a downstream conversion module for converting a legacy downstream electrical signal of said legacy downstream frequency band into an extended downstream optical signal of said extended downstream frequency band, wherein said extended downstream frequency band comprises at least a sub-set of a frequency band of 1000-3000 MHz;

a first optical diplexer to route said extended downstream optical signal and a legacy downstream optical signal from said head-end apparatus to a first fiber section for transferring on said first fiber section both said extended downstream optical signal and said legacy downstream optical signal from said head-end apparatus to a node; and a node including an optical-to-electrical converter to convert said extended downstream optical signal into an extended downstream electrical signal of said extended downstream frequency band.

11. The wideband distribution network of claim 10, wherein said wide frequency band includes a legacy upstream frequency band and an extended upstream frequency band, said extended upstream frequency band comprises at least a sub-set of a frequency band of 1000-3000 MHz, wherein said node comprises an electrical-to-optical converter to convert an extended upstream electrical signal of said extended upstream frequency band into an extended upstream optical signal of said extended upstream frequency band, and wherein said head-end apparatus comprises an upstream conversion module for converting said extended upstream optical signal into a legacy upstream electrical signal of said legacy upstream frequency band.

12. The wideband distribution network of claim 9, comprising:

a second optical diplexer to route an extended upstream optical signal of said extended upstream frequency band and a legacy upstream optical signal to said head-end apparatus from a second fiber section for transferring both said extended upstream optical signal and a legacy upstream optical signal from said node to said head-end apparatus.

13. The wideband distribution network of claim 9 comprising:

a third optical diplexer to route said extended downstream optical signal from said first fiber section to said optical-to-electrical converter in said node, and to route said legacy downstream optical signal from said first fiber section to said node; and a forth optical diplexer to route said extended upstream optical signal from said electrical-to-optical converter in said node to said second fiber section, and to route a legacy upstream optical signal from said node to said second fiber section.

14. The wideband distribution network of claim 11 comprising:

a second optical diplexer to route said extended upstream optical signal from said electrical-to-optical converter in said node to said first fiber section, wherein said first diplexer is able to route said extended upstream optical signal from said first fiber section to said upstream conversion module, and wherein said second diplexer is able to route said extended downstream optical signal from said first fiber section to said optical-to-electrical converter in said node.

15. A method for communicating with one or more nodes of a wideband distribution network supporting a wide frequency band including at least a legacy downstream frequency band and an extended downstream frequency band, the method comprising:

converting by a downstream conversion module in a head-end apparatus a legacy downstream electrical signal of said legacy downstream frequency band into an extended downstream optical signal of said extended downstream frequency band, wherein said extended downstream frequency band comprises at least a sub-set of a frequency band of 1000-3000 MHz;

routing by an optical diplexer said extended downstream optical signal and a legacy downstream optical signal from said head-end apparatus to a fiber section; and transferring by said fiber section both said extended downstream optical signal and said legacy downstream optical signal from said head-end apparatus to a node.

16. The method of claim 15, wherein converting said legacy downstream electrical signal comprises:

up-converting said legacy downstream electrical signal into an up-converted downstream electrical signal of said extended downstream frequency band; and converting said up-converted electrical signal into said extended downstream optical signal.

17. The method of claim 15 comprising:
Converting in said node said extended downstream optical signal into an extended downstream electrical signal of said extended downstream frequency band.

18. The method of claim 15, wherein said legacy downstream frequency band comprises at least a sub-set of a legacy frequency band of 5-1000 MHz.

19. A method for communicating with one or more nodes of a wideband distribution network supporting a wide frequency band including at least a legacy upstream frequency band and an extended upstream frequency band, the method comprising:
routing by a optical diplexer an extended upstream optical signal of said extended upstream frequency band and a legacy upstream optical signal from a fiber section to a head-end apparatus;
transferring by said fiber section both said extended upstream optical signal and said legacy upstream optical signal from a node to said head-end apparatus; and
converting by an upstream conversion module in said head-end apparatus said extended upstream optical signal of said extended upstream frequency band into a legacy upstream electrical signal of said legacy upstream frequency band, wherein said extended upstream frequency band comprises at least a sub-set of a frequency band of 1000-3000 MHz.

20. The method of claim 19, wherein converting said extended upstream optical signal comprises:
converting said extended upstream optical signal into an extended upstream electrical signal of said extended upstream frequency band; and
down-converting said extended upstream electrical signal into said legacy upstream electrical signal.

21. The method of claim 19 comprising:
converting in said node an extended upstream electrical signal of said extended upstream frequency band into said extended upstream optical signal of said extended upstream frequency band.

22. The method of claim 19, wherein said legacy upstream frequency band comprises at least a sub-set of a legacy frequency band of 5-1000 MHz.

* * * * *